United States Patent
Rajan et al.

(10) Patent No.: US 7,170,893 B2
(45) Date of Patent: Jan. 30, 2007

(54) TECHNIQUE FOR SELECTING THE NUMBER OF PACKETS TO BE CONCATENATED

(75) Inventors: Govinda Nallappa Rajan, Huizen (NL); Kotikalapudi Sriram, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 930 days.

(21) Appl. No.: 09/882,119

(22) Filed: Jun. 15, 2001

(65) Prior Publication Data

US 2002/0196787 A1    Dec. 26, 2002

(51) Int. Cl.
H04L 12/56    (2006.01)
H04J 3/24    (2006.01)

(52) U.S. Cl. .............. 370/393; 370/471; 370/473; 370/474

(58) Field of Classification Search ........... 370/389, 370/391–393, 395.21, 395.42–43, 395.43, 370/395.5, 395.52, 412–414, 417, 429, 470, 370/473, 474, 329–236
See application file for complete search history.

(56) References Cited

U.S. PATENT DOCUMENTS 6,157,955 A * 12/2000 Narad et al. ............ 709/228
6,389,038 B1 * 5/2002 Goldberg et al. ........... 370/471
6,430,154 B1 * 8/2002 Hunt et al. ............... 370/230.1
6,538,992 B1 * 3/2003 Subbiah et al. ............ 370/230
6,633,540 B1 * 10/2003 Raisanen et al. ......... 370/230.1
6,665,495 B1 * 12/2003 Miles et al. ................ 398/54
6,678,474 B1 * 1/2004 Masuda et al. ............. 398/75
6,697,984 B1 * 2/2004 Sim et al. .................. 714/751
6,760,309 B1 * 7/2004 Rochberger et al. ....... 370/235
6,771,663 B1 * 8/2004 Jha ........................ 370/473
6,847,643 B2 * 1/2005 Nie ........................ 370/391
2004/0213248 A1 * 10/2004 Okuda et al. ............ 370/395.1

* cited by examiner

*Primary Examiner*—Chi Pham
*Assistant Examiner*—Tri H. Phan

(57) ABSTRACT

A communication node comprises a receiver for receiving packets and a routing device for routing the received packets to one of two output ports. For each output port, the communication node further comprises a classifier for classifying a received packet based on its traffic characteristic and storing that packet in a corresponding queue for that traffic characteristic, and a concatenated packets preparer for concatenating n received packets from each queue to form a concatenated packet to be transmitted by the associated output port, where the maximum of n is determined based on the traffic characteristic of the associated queue.

14 Claims, 5 Drawing Sheets

FIG. 4

410 — Receiving packets having at least one traffic characteristic from at least one input port

420 — Concatenating $n$ received packets that have a common traffic characteristic requiring a delay of less than $r$ milliseconds to form a concatenated packet for transmission to another node through a channel having a bandwidth of $B$ bytes/second in a communication network, where the concatenated packet comprising a common header, a content information part for each of the $n$ received packets, and a payload for each of the $n$ received packets, the size of the concatenated packet is less than or equal to the maximum allowed by the network, and $n$ is determined by solving $$(H + nI + \sum_{i=1}^{n} P_i)/B < r/1000$$

where $H$ is the size in bytes of the common header, $I$ is the size in bytes of the content information part of each of the $n$ packets, and $P_i$ is the size of the payload in bytes of the $i$th of the $n$ received packets

430 — Transmitting the concatenated packet to another node through the channel

US 7,170,893 B2

TECHNIQUE FOR SELECTING THE NUMBER OF PACKETS TO BE CONCATENATED

FIELD OF THE INVENTION

The present invention relates to data communication and, more particularly to packet communication.

BACKGROUND OF THE INVENTION

In a packet communication network, two nodes communicate with each other by sending packets. A packet is a data unit that comprises a header for information about the packet and a payload (body part) for data transmitted via the packet. Generally, the header comprises information such as the type of the packet, the source address, and the destination address.

Unfortunately, a significant portion of a transmitted packet is the header. For example, it is known that about 38.9% of the packets transmitted via the Internet have a total length of 40 bytes. These packets are in accordance with the Internet Protocol version 4 (IPv4) and since IPv4 requires a header of 20 bytes, only 50% of the occupied bandwidth of an IP packet is used for the payload.

SUMMARY OF THE INVENTION

One way to reduce the amount of bandwidth taken up by a packet header is to concatenate two or more packets to form a concatenated packet. The concatenated packet comprises a common header and a payload. The common header comprises a standard header associated with the protocol and other common information for all packets being concatenated. The payload of the concatenated packet comprises a content information part and a payload for each of the packets being concatenated. However, if the concatenation approach is used, the number of packets to be concatenated must be determined. In accordance with the principles of the invention, a number of received packets, n, are concatenated to form a concatenated packet for transmission to another node, wherein the number of received packets, n, is based on a common traffic characteristic of the received packets.

An embodiment is a router that has two input ports and two output ports. The router comprises a receiver for receiving packets and a routing device for routing the received packets to one of the two output ports. For each output port, the router further comprises a traffic characteristic classifier for classifying a received packet based on its traffic characteristic, a corresponding traffic characteristic queue for storing the received packet, and a concatenated packets preparer for concatenating n received packets from one of the traffic characteristic queues to form a concatenated packet to be transmitted by the associated output port, where the maximum value for n is determined based on the traffic characteristic of the associated traffic characteristic queue.

BRIEF DESCRIPTION OF THE DRAWINGS

The present invention will be more fully appreciated from a consideration of the following Detailed Description, which should be read in light of the accompanying drawings in which:

FIG. 4 shows an exemplary flowchart for determining the number of packets to be concatenated based on the delay requirement in accordance with the principles of the invention.

DETAILED DESCRIPTION

Figure 1:
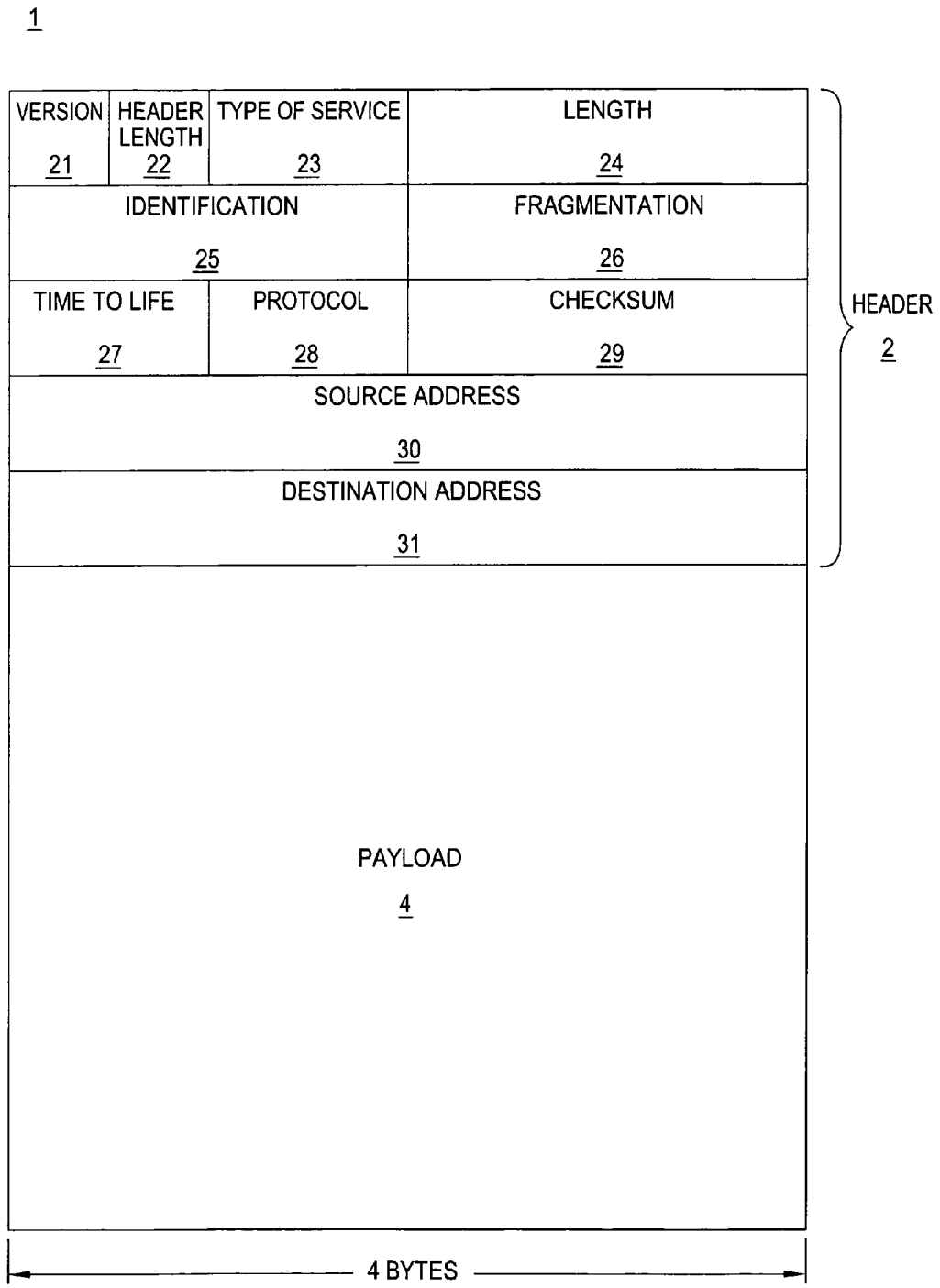
FIG. 1 shows an Internet Protocol (IP) packet as is commonly transmitted.

FIG. 1 diagrammatically shows an IPv4 packet as is commonly transmitted. Packet 1 includes header 2 and payload 4. Header 2 contains 11 fields, fields 21–31. Field 21 is a 4-bit Version field that indicates the IP protocol version. Field 22 is a 4-bit Header Length field that indicates the size of the header (which is 20 bytes as required by the IPv4 protocol). Field 23 is an 8-bit Type of Service field that indicates the type of service. One indication provided by field 23 is traffic characteristic such as the delay and the throughput requirements of packet 1. Under IPv4, two types of delay requirement are supported: low delay and normal delay. Examples of low delay traffic are voice and video traffic. The voice and video traffic requires a delay of less than 10 and 100 milliseconds, respectively. An example of a normal delay traffic is data traffic, that, generally, does not have a delay requirement. In the following and for illustration purposes, all low delay traffic including voice and video are treated as having a traffic characteristic that requires a delay of less than 10 milliseconds and all normal delay traffic are treated as having a traffic characteristic that has no delay requirement, i.e., delay insensitive. Field 24 is a 16-bit Length field that indicates the total length of packet 1. Field 25 is a 16-bit Identification field that indicates the identity of packet 1, making it possible to gather IP datagrams with the same identifier and reassemble them. Field 26 is a 16-bit Fragmentation field that contains information necessary to place a number of IP datagrams with the same identifier in the correct order. Field 27 is an 8-bit Time To Life field that indicates the life time of packet 1. Field 28 is an 8-bit Protocol field which is a demultiplexing key that identifies a higher level protocol which packet 1 should be passed to, for example, Transmission Control Protocol (TCP) or User Datagram Protocol (UDP). Field 29 is a 16-bit Checksum field that is used to check for transmitter errors in the header. Fields 30 and 31 are 32-bit Source and Destination address fields that respectively specify the source and destination addresses of packet 1.

Figure 2:
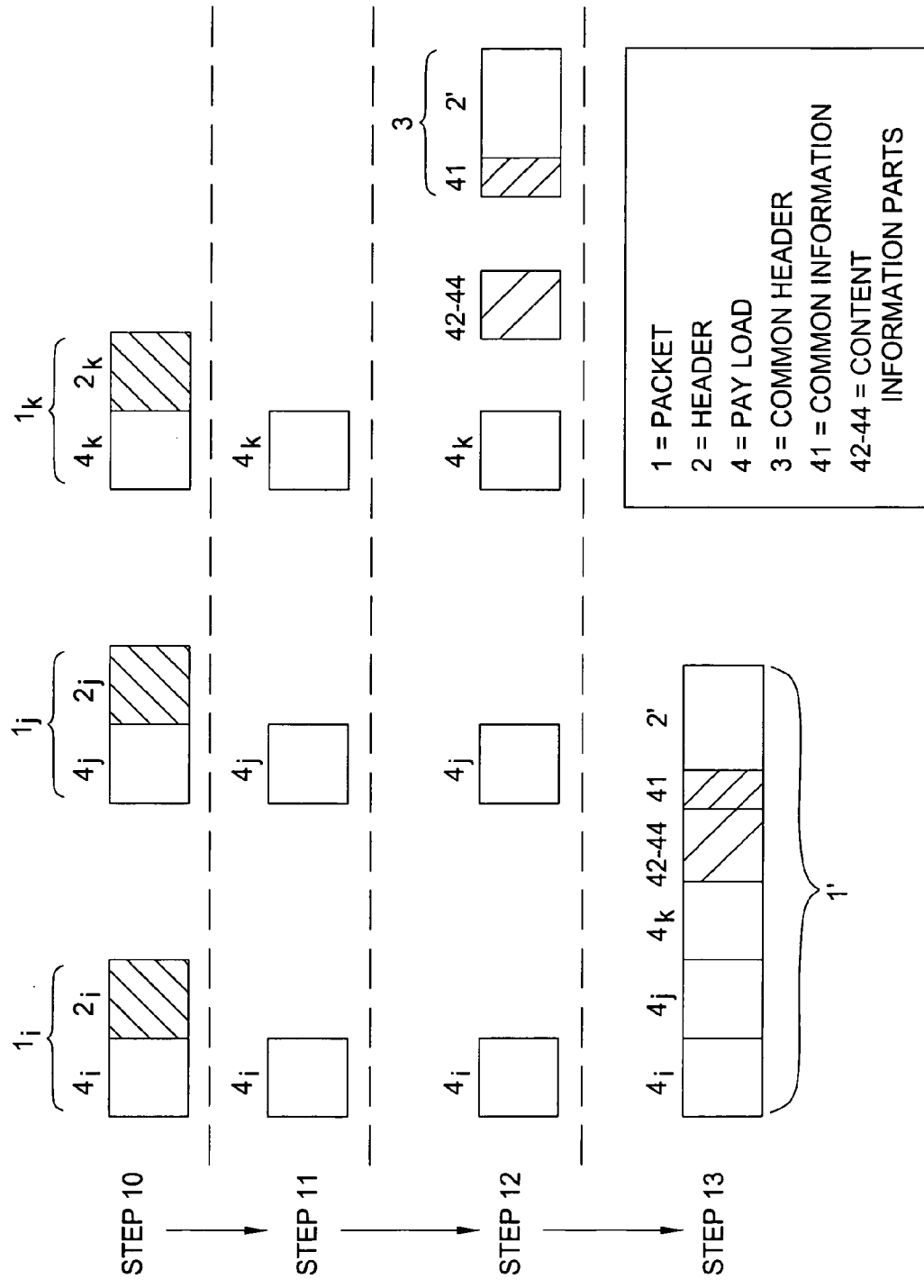
FIG. 2 diagrammatically shows the steps of an example method according to the invention.

FIG. 2 diagrammatically shows steps of an example method according to invention, in which three packets $1_i$, $1_j$, and $1_k$ are concatenated. First, the header and the payload of each packet are determined as shown in step 10. For example, the header and the payload of packet $1_i$ is determined to be $2_i$ and $4_i$, respectively. The destination addresses of packets $1_i$–$1_k$ are extracted from respective headers and then are stored, for example, in a memory (not shown). The headers are then discarded, and the remaining payloads as shown in step 11 are stored in the same or different memory (not shown). After the extraction of the destination addresses and the payloads, the elements of a concatenated packet are formed in step 12. In addition to the three payloads from packets $1_i$–$1_k$, common header 3 and content information parts 42–44 are formed. Common header 3 includes standard IPv4 header 2' and common information 41. Each content information part contains packet specific information about the associated packet to be concatenated (described below). At step 13, all elements shown in step 12 are combined to form concatenated packet 1'. In this example, common information 41 contains the payload size per packet being concatenated, assuming that the payload sizes of packets $1_i$–$1_k$ are the same. If the payload sizes of packets $1_i$–$1_k$ are different, field 41 would be expanded to three fields, each of which indicates the respective payload sizes of packets $1_i$–$1_k$, and the three fields would not be part of the common header because they are packet specific. Each field of standard IPv4 header 2' is filled accordingly. For example, the Destination Address field of standard IPv4 header 2' is filled with the address of the next node where concatenated packet 1' is to be received and the 16-bit Length field is filled with the sum of the sizes of the common header, the content information parts, and the payloads of packets $1_i$–$1_k$. In this example, content information parts 42–44 contains the respective stored (original) destination addresses of packets $1_i$–$1_k$.

Figure 3:
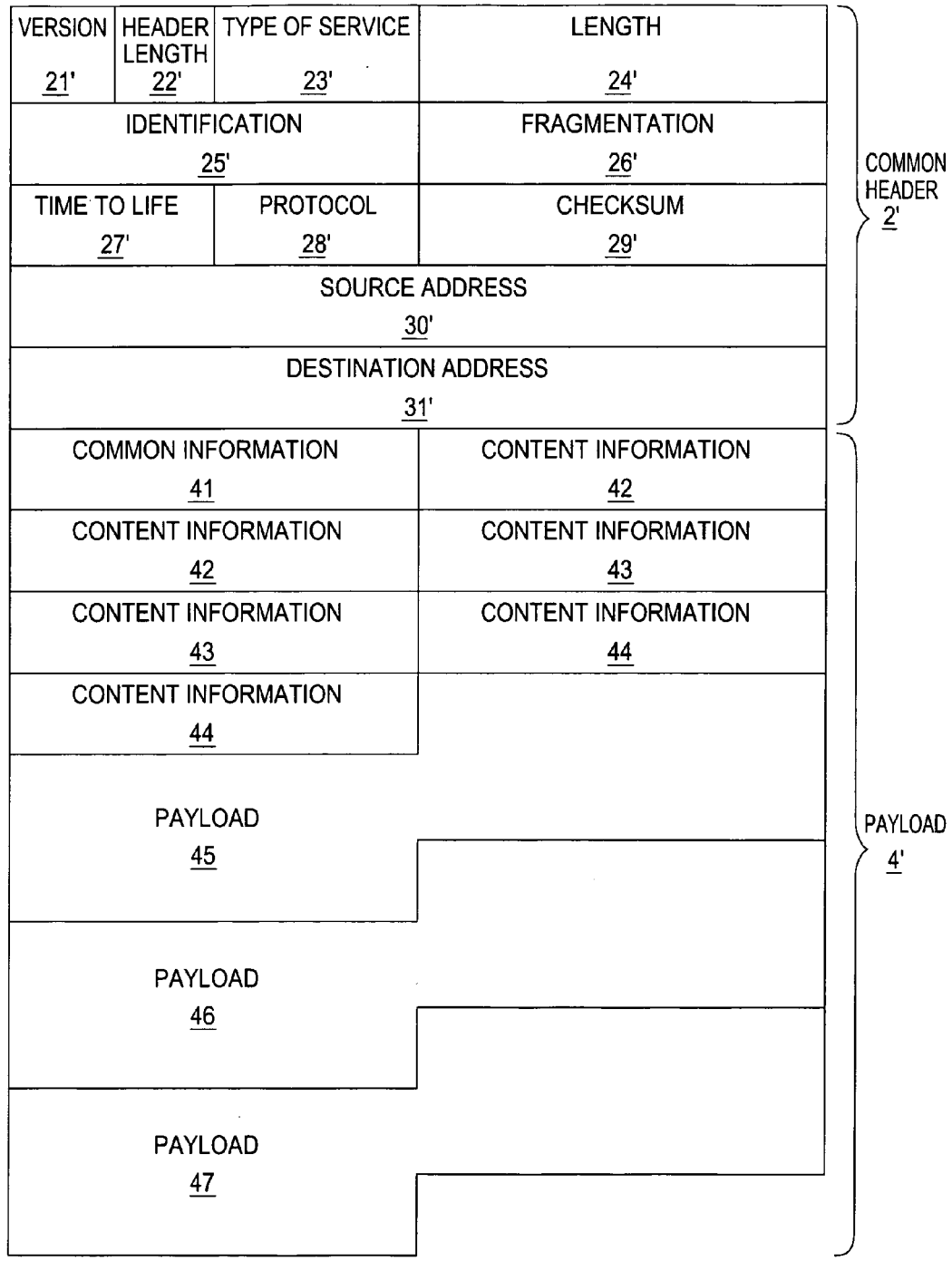
FIG. 3 shows an example of a concatenated packet after applying the example method according to the invention.

Refer now to FIG. 3 for a detailed layout of concatenated packet 1' in accordance with the principles of the invention where fields 45–46 store payloads $4_i$–$4_k$ as shown in FIG. 2, respectively. Fields 21'–31' are fields of standard IPv4 header 2' in FIG. 2 and, thus, have the same meaning as fields 21–31 of packet 1 in FIG. 1. As mentioned above, the destination address in field 31' is the address of the next node where concatenated packet 1' is to be received.

Referring now to FIG. 4, an exemplary flowchart for determining the number of packets to be concatenated at a node in accordance with the principles of invention is shown. A node is a processor-based equipment in a packet communication network, such as a router, a hub, a switch, or an end-user computer. For illustration purposes, the node is a router and supports IPv4. At block 410, the node receives packets with different traffic characteristics from at least one input port. For example, the node receives packets with two traffic characteristics, low delay and normal delay. At block 420 and in accordance with the principles of the invention, the node concatenates n received packets that have a common traffic characteristic requiring a delay of less than r milliseconds to form a concatenated packet for transmission to another node through a channel having a bandwidth of B bytes/second in a communication network. The concatenated packet comprises a common header, a content information part for each of the n received packets, and a payload for each of the n received packets. A method for calculating n is described below. The size of the concatenated packet should not be greater than the maximum allowed by the communication network. Once the value for n is determined, the size of the concatenated packet, C, is calculated as follows:

$$C = H + nI + \sum_{i=1}^{n} P_i \qquad (1)$$

where H is the size (in bytes) of the header, I is the size of the content information part of each of the n received packets, and $P_i$ is the size of the payload of the ith of the n received packets. As known in the art, the maximum packet size (maximum transfer unit) in a LAN (Local Area Network) is typically 1536 bytes and it varies from 128 bytes to 10 kilobytes for a WAN (Wide Area Network).

According to the principles of the invention, n is determined by solving the following inequality:

$$\left(H + nI + \sum_{i=1}^{n} P_i\right) / B < r/1000 \qquad (2)$$

Assume that a DS1, the rate of which is 1.544 Megabits/second or 193,000 bytes/seconds, is the communication channel, and that r is 10 milliseconds and that the maximum packet size allowed by the communication network is 1536 bytes. Further assume that the sizes of the various parts of the concatenated packet, the common header, the content information part of each packet being concatenated, and the payload size of each packet being concatenated are respectively 22 bytes, 4 bytes, and 20 bytes. Substituting these values for the respective variables in Eq. (2), the maximum of n would be 80. However, substituting 80 for n in Eq. (1), the size of the concatenated packet calculated would be 1944 bytes which is more than 1536 bytes allowed. Thus, n has to be adjusted, so that the size of the concatenated packet would be less than or equal to 1536 bytes. It should be noted that the channel could be a logical channel in a wired or wireless network.

To reduce processing time, the size of the payload of each packet can be assumed to be the size of the maximum possible payload size, $P_{max}$, for a traffic characteristic group. In this case, n is calculated as follows:

$$(H+n(I+P_{max}))/B<r/1000 \qquad (3)$$

Other traffic characteristics can be used to determine the number of packets to be concatenated. For example, under IPv4, the traffic characteristic can be of normal delay, which, as mentioned above, is treated as delay insensitive. In this case, n is calculated as follows:

$$H + nI + \sum_{i=1}^{n} P_i < M \qquad (4)$$

where M is the maximum size of a packet allowed by the communication network. Using the same parameters in the previous example, the maximum n allowed would be 63. If the size of the payload of each packet is assumed to be the size of the maximum possible payload size, $P_{max}$, for a traffic characteristic group, n is calculated as follows:

$$H+n(I+P_{max})<M \qquad (5)$$

For example, voice traffic has a traffic characteristic requirement of a maximum of 10-millisecond packetization delay at the point of origination and usually the source encoding rate is 64 kilobits/second or 8 kilobytes/second. Thus, the maximum payload size for voice traffic is 8 kilobytes/second*10 milliseconds, which is approximately 80 bytes, i.e., $P_{max}$=80 bytes. Using the parameters above and applying Eq. (5), the maximum n is 18. It should be noted that in forming a concatenated packet for low delay packets, if the number of available low delay packets is smaller than the maximum n determined by Eq. (2), other normal delay packets could be used to fill the gap. Finally, at block 430, the node transmits the concatenated packet to another node through the channel.

Figure 5:
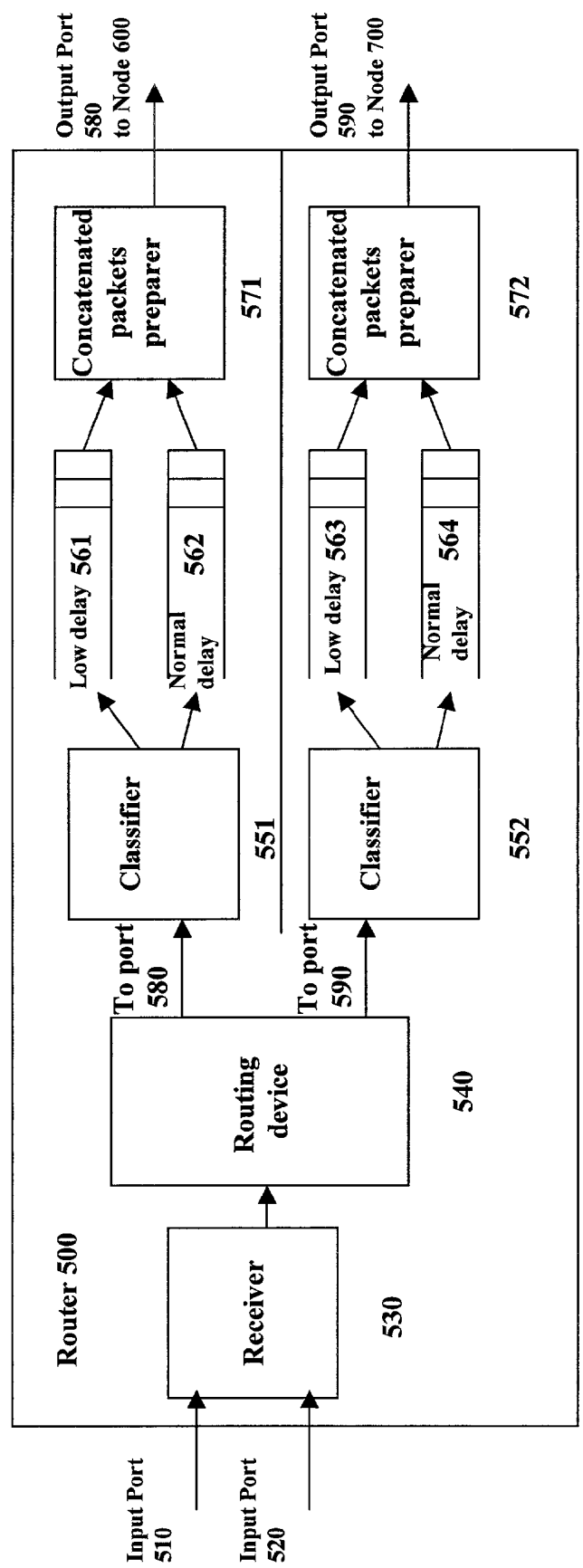
FIG. 5 shows an illustrative router in accordance with the principles of the invention.

Referring now to FIG. 5, an illustrative router in accordance with the principles of the invention is shown. Elements of the illustrative router are microprocessor-based software programs and some buffers. They can be application specific integrated circuits as well. For illustration purposes, router 500 supports IPv4. Router 500 illustratively has two input ports, 510 and 520, and two output ports, 580 and 590. Router 500 comprises receiver 530 and routing device 540. Router 500 further comprises classifiers 551 and 552, low delay queues 561 and 563, normal delay queues 562 and 564, and concatenated packets preparers 571 and 572 respectfully for output ports 580 and 590. Receiver 530 receives packets having both low and normal delay traffic characteristics. Routing device 540 routes packets to either port 580 or port 590. For packets routed to port 580, classifier 551 classifies packets into the low and normal delay traffic characteristic groups and respectively stores the packets at low delay queue 561 and normal delay queue 562. Concatenated packets preparer 571 concatenates packets from low delay queue 561 and normal delay queue 562, where the number of packets to be concatenated in each queue is determined by satisfying Eqs. (2) and (4), respectively. Packets routed to port 590 are similarly handled by classifier 552, low delay queue 563, normal delay queue 564, and concatenated packets preparer 572. It should be noted that routing device is not needed if there is only one output port. In that case, only one each of classifiers, low delay queues, normal delay queues, and concatenated packets preparers are needed.

It should be noted that although shown as a wired network, the invention could equally be applied to a wireless network. The invention could be applied to packets transmitted under other protocols such as Ethernet, ATM, and Frame Relay. The traffic characteristics can be found in their respective communication protocols. As an example, IEEE 802.1d, a LAN (Ethernet) standard, defines at least the following three traffic characteristics: less than 10-millisecond delay for voice, less than 100-millisecond delay for video, and no delay requirement for data. It should be noted that the technique could also be applied to packets that do not have a field for indicating a traffic characteristic. For example, if the concatenation occurs between VPN (Virtual Private Network) end-points, the VPN end-points would have knowledge of an application's delay requirement and, thus, can decide the number of packets to be concatenated based on that knowledge.

A method or an apparatus for selecting the number of packets to be concatenated based on a traffic characteristic can be implemented using the teachings of the present invention. Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention.

What is claimed is:

1. A method for concatenating packets to be transmitted from a first node to a second node, the method comprising the steps of:
   (a) receiving packets having at least one traffic characteristic from at least one input port;
   (b) concatenating n received packets to form a concatenated packet, wherein the concatenated packet comprises a common header, a content information part of each of the n received packets, and a payload of each of the n received packets; and
   (c) transmitting the concatenated packet from the first node to the second node, wherein the n received packets have a common traffic characteristic and n is determined based on the common traffic characteristic and at least one packet characteristic, wherein the at least one packet characteristic comprises a size of the common header, a size of the content information part of each of the n received packets, and one of a size of the payload of each of the n received packets or a maximum possible payload size of a received packet having the common traffic characteristic.

2. The method of claim 1, wherein the concatenated packet is transmitted through a channel in a communication network, wherein the common traffic characteristic requires a delay of less than p milliseconds.

3. The method of claim 2, wherein the channel has a bandwidth of B and n is determined by solving n from an equation of the form $$\left(H + nI + \sum_{i=1}^{n} P_i\right)\Big/B < p/1000.$$

where H is the size of the common header, I is the size of the content information part of each of the n received packets, and $P_i$ is the size of the payload of the ith of the n received packets.

4. The method of claim 2, wherein the channel has a bandwidth of B and if $P_{max}$ represents the maximum possible payload size of a received packet having the common traffic characteristic, n is determined by solving n from an equation of the form $(H+n(I+P_{max}))/B \leq p/1000$, where H is the size of the common header and I is the size of the content information part of each of the n received packets.

5. The method of claim 1, wherein the concatenated packet is transmitted through a channel in a communication network, wherein the common traffic characteristic is delay insensitive.

6. The method of claim 5, wherein a maximum packet size allowed by the communication network is M bytes and n is determined by solving n from an equation of the form $$H + nI + \sum_{i=1}^{n} P_i \leq M,$$

where H is the size of the common header, I is the size of the content information part of each of the n received packets, and $P_i$ is the size of the payload of the ith of the n received packets.

7. The method of claim 5, wherein a maximum packet size allowed by the communication network is M bytes and if $P_{max}$ represents the maximum possible payload size of a received packet having the common traffic characteristic, n is determined by solving n from an equation of the form $H+n(I+P_{max}) \leq M$, where H is the size of the common header, and I is the size of the content information part of each of the n received packets.

8. An apparatus for concatenating packets to be transmitted from a first node to a second node, the apparatus comprising:
   (a) at least one input port for receiving packets;
   (b) a traffic characteristic classifier for classifying and storing received packets of different traffic characteristics into different traffic characteristic groups in memory;
   (c) a concatenated packets preparer for forming a concatenated packet from n received packets, wherein the concatenated packet comprises a common header, a content information part of each of the n received packets, and a payload of each of the n received packets; and (d) at least one output port for transmitting the concatenated packet to the second node, wherein the n packets belong to one traffic characteristic group and n is determined based on the traffic characteristic of the one traffic characteristic group and at least one packet characteristic, wherein the at least one packet characteristic comprises a size of the common header, a size of the content information part of each of the n received packets, and one of a size of the payload of each of the n received packets or a maximum possible payload size of a received packet having the traffic characteristic of the one traffic characteristic group.

9. The apparatus of claim 8, wherein the concatenated packet is transmitted through a channel in a communication network, wherein the n packets belong to the one traffic characteristic group that requires a delay time of less than p milliseconds, wherein the common header includes H bytes, the content information part of each of the n received packets includes I bytes, and the payload for ith of the n received packets includes $P_i$ bytes.

10. The apparatus of claim 9, wherein the channel has a bandwidth of B and n is determined by solving n from an equation of the form $$\left(H + nI + \sum_{i=1}^{n} P_i\right) / B < p/1000.$$

11. The method of claim 9, wherein the channel has a bandwidth of B and if $P_{max}$ max represents the maximum possible payload size of a received packet having the common traffic characteristic, n is determined by solving n from an equation of the form $(H+n(I+P_{max}))/B \leq p/1000$.

12. The apparatus of claim 8, wherein the concatenated packet is transmitted through a channel in a communication network, wherein the n packets belong to the one traffic characteristic group that is delay insensitive, wherein the common header includes H bytes, the content information part of each of the n received packets includes I bytes, and the payload for ith of the n received packets includes $P_i$ bytes.

13. The apparatus of claim 12, wherein a maximum packet size allowed by the communication network is M bytes and n is determined by solving n from an equation of the form $$H + nI + \sum_{i=1}^{n} P_i \leq M.$$

14. The method of claim 12, wherein a maximum packet size allowed by the communication network is M bytes and if $P_{max}$ represents the maximum possible payload size of a received packet having the common traffic characteristic, n is determined by solving n from an equation of the form $H+n(I+P_{max}) \leq M$.

* * * * *